United States Patent
Dutta et al.

(10) Patent No.: US 7,542,041 B2
(45) Date of Patent: Jun. 2, 2009

(54) RUNTIME CONFIGURABLE VIRTUAL VIDEO PIPELINE

(75) Inventors: Santanu Dutta, Sunnyvale, CA (US); Jens Rennert, Santa Clara, CA (US)

(73) Assignee: NXP B.V., Eindhoven (NL)

( * ) Notice: Subject to any disclaimer, the term of this patent is extended or adjusted under 35 U.S.C. 154(b) by 288 days.

(21) Appl. No.: 10/552,105

(22) PCT Filed: Apr. 2, 2004

(86) PCT No.: PCT/IB2004/000994

§ 371 (c)(1),
(2), (4) Date: Oct. 3, 2005

(87) PCT Pub. No.: WO2004/088527

PCT Pub. Date: Oct. 14, 2004

(65) Prior Publication Data

US 2006/0197765 A1 Sep. 7, 2006

Related U.S. Application Data

(60) Provisional application No. 60/460,230, filed on Apr. 3, 2003.

(51) Int. Cl.
G06T 1/20 (2006.01)
G09G 5/02 (2006.01)
G06F 13/14 (2006.01)

(52) U.S. Cl. .................. 345/506; 345/589; 345/604; 345/519

(58) Field of Classification Search ................ 345/506, 345/589–604
See application file for complete search history.

(56) References Cited

U.S. PATENT DOCUMENTS

| 5,798,770 A | * | 8/1998 | Baldwin ............... 345/506 |
| 6,717,576 B1 | * | 4/2004 | Duluk et al. .......... 345/419 |
| 2003/0137606 A1 | * | 7/2003 | Rumreich et al. ...... 348/675 |
| 2004/0025000 A1 | * | 2/2004 | Wise et al. ........... 712/300 |

* cited by examiner

Primary Examiner—Kee M Tung
Assistant Examiner—Jacinta Crawford

(57) ABSTRACT

A multiple-pipeline system (300) includes a pool (330) of auxiliary function blocks (A-E 335) that are provided as required to select pipelines. Each pipeline (320) in the multiple-pipeline system (300) is configured to include a homogeneous set of core functions (F1-F6). A pool (330) of auxiliary functions (A-E 335) is provided for selective insertion of auxiliary functions (A-E 335) between core functions (F1-F6) of select pipelines. Each auxiliary function includes a multiplexer that allows it to be selectively coupled within each pipeline.

16 Claims, 2 Drawing Sheets

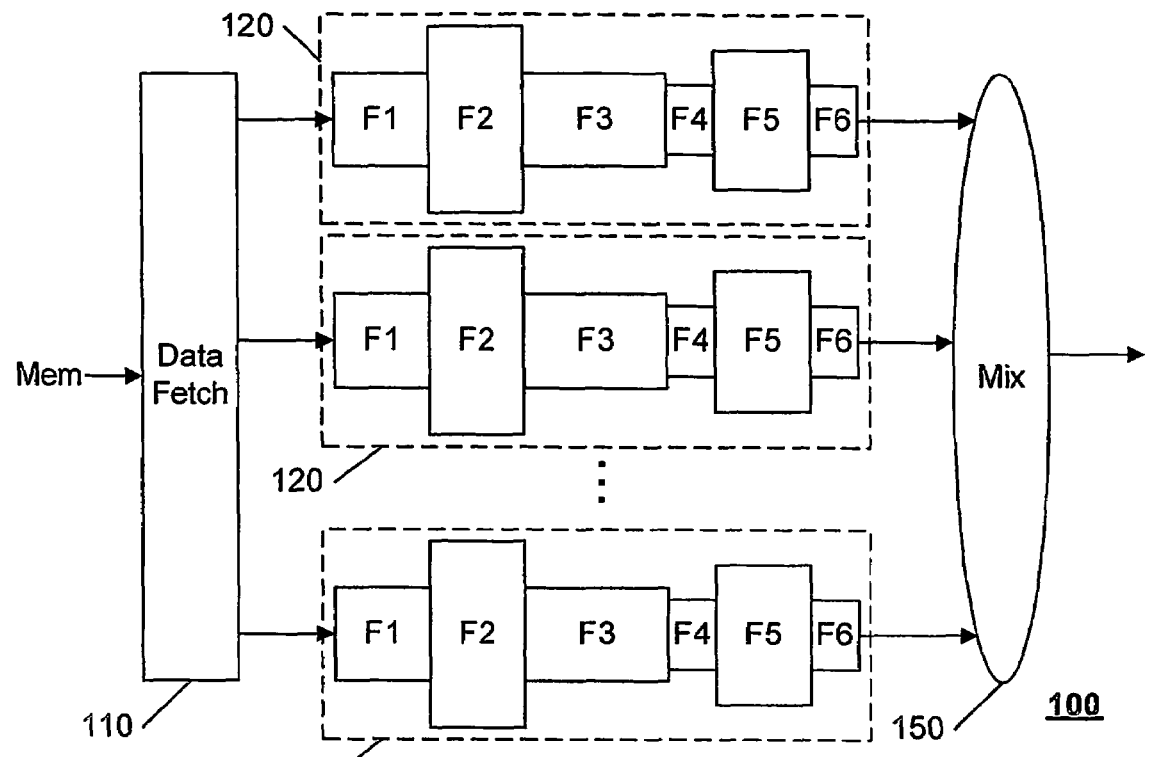
FIG. 1 [Prior Art]
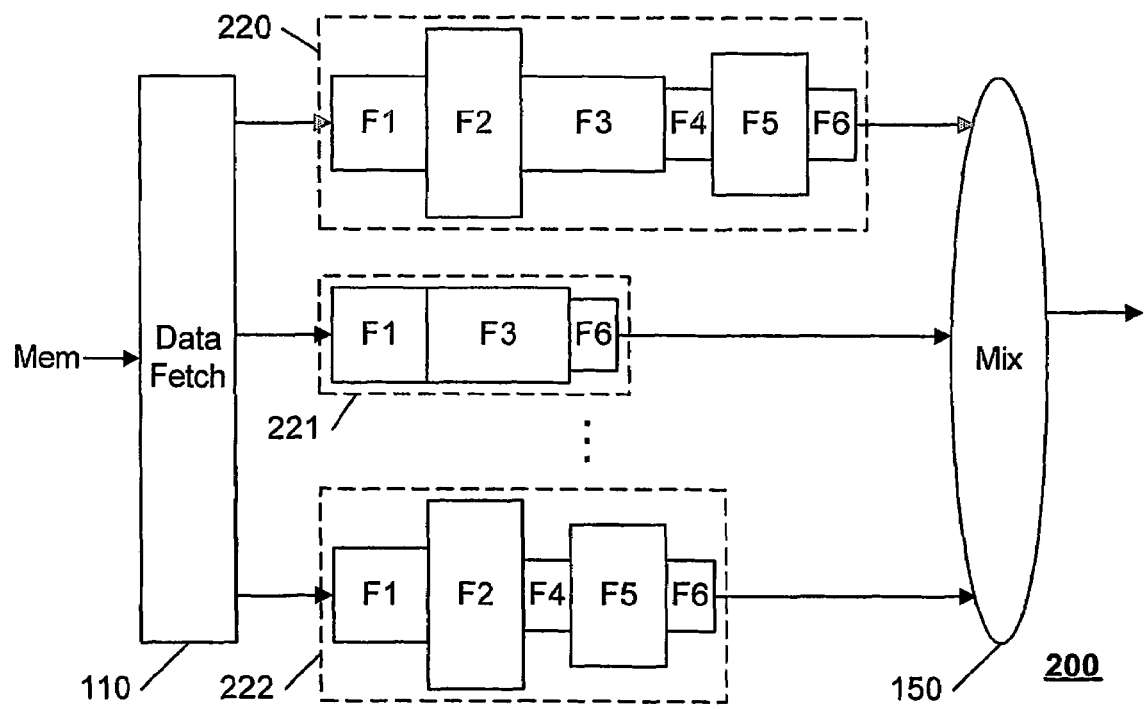
FIG. 2 [Prior Art]

RUNTIME CONFIGURABLE VIRTUAL VIDEO PIPELINE

CROSS REFERENCE TO RELATED APPLICATION

This application claims the benefit of U.S. provisional application Ser. No. 60/460,230 filed 3 Apr. 2003, which is incorporated herein by reference.

This invention relates to the field of computer processing, and in particular to a method and system for dynamically configuring a multi-pipe pipeline system, such as a video processing pipeline system.

Pipeline systems are commonly used to sequentially process data. The data is sequentially transferred from one functional unit to the next in a continuous manner, undergoing one or more transformations during its progression through the functional units. Video data, for example, is sequentially processed to scale the image for display, sharpen the contrast, correct for color distortions, and so on.

Multiple-pipe systems are commonly used in advanced video processing systems to produce a composite image that is a combination of images from a variety of sources, and/or a combination of different effects on the same image. A composite image containing a picture-in-picture (PIP), for example, is formed by the independent processing of each of the two images that are combined to form the PIP image.

FIGS. 1 and 2 illustrate examples of conventional multiple-pipe systems, comprising pipelines 120, 220-222 that process streams of data between a source 110 and a mixer 150 that produces a composite output based on the processing of the streams through each pipeline. The various sizes of the functional blocks F1-F5 are illustrated to demonstrate that each block consumes different amounts of resources, such as area, cost, power, and so on.

FIG. 1 illustrates a general-purpose homogeneous multiple-pipe system 100, wherein each pipe 120 comprises the same combination of functional blocks F1-F2-F3-F4-F5-F6. A data fetch module 110 provides the data that forms the input data stream to each of the pipelines, typically from a memory or other pipelines. Each data stream progresses through the same sequence of functional blocks, potentially undergoing different transformations based on different parameters provided to each block. For example, one of the functional blocks may be a scaling block, and in the PIP example, each of the image streams undergoes a different scaling. Because each of the pipelines 120 is identical, maximum flexibility is provided, because any of the pipelines 120 can be used to provide any of the desired functions F1-F6.

FIG. 2, on the other hand, illustrates a heterogeneous multiple-pipe system 200, wherein the pipelines 220-222 differ in available functions. Because each pipeline does not necessarily contain all of the available functional blocks F1-F6, fewer resources are consumed. Such a system 200 is used when it is known, or assumed, that certain data streams do not require particular functions. For example, in a PIP system, it may be assumed that only the smaller inserted image need be scaled, and thus the pipeline that processes the full-scale image need not include a scaling function. In like manner, the pipeline that processes the scaled image may not need to include a contrast-enhancement block. Because the pipelines 220-222 are each customized to an anticipated application, the flexibility of the system 200 for use in other applications is limited.

The homogeneity of the system 100, in addition to providing flexibility, also eases the task of programming or controlling the system 100 to perform a given set of transformations by appropriately setting the parameters of each functional block F1-F6. The heterogeneous system 200, on the other hand, typically requires a control scheme that is customized to each different pipeline 220-222.

It is an object of this invention to provide a multiple-pipeline system that incorporates the flexibility of a homogeneous system and the efficiency of a heterogeneous system. It is a further object of this invention to provide a multiple-pipeline system that is dynamically configurable to effect various combinations of functions for each pipeline.

These objects, and others, are achieved by a multiple-pipeline system that includes a pool of auxiliary function blocks that are provided as required to select pipelines. Each pipeline in the multiple-pipeline system is configured to include a homogeneous set of core functions. A pool of auxiliary functions is provided for selective insertion of auxiliary functions between core functions of select pipelines. Each auxiliary function includes a multiplexer that allows it to be selectively coupled within each pipeline.

FIG. 1 illustrates an example block diagram of a prior art homogeneous multiple-pipeline system.

FIG. 2 illustrates an example block diagram of a prior art heterogeneous multiple-pipeline system.

Throughout the drawings, the same reference numeral refers to the same element, or an element that performs substantially the same function.

Figure 3:
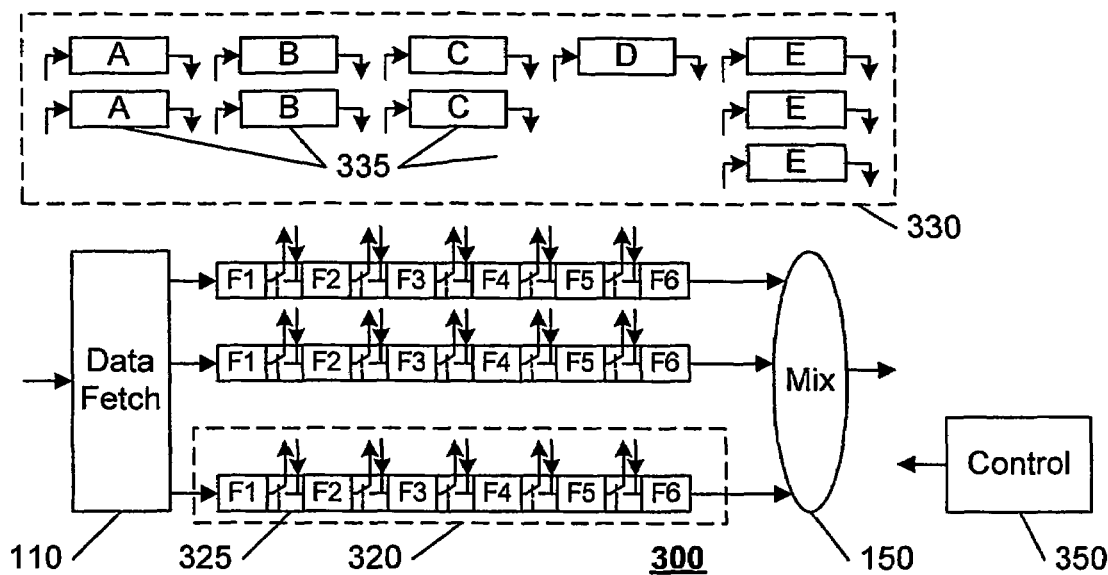
FIG. 3 illustrates an example block diagram of a configurable multiple-pipeline system in accordance with this invention.

FIG. 3 illustrates an example block diagram of a configurable multiple-pipeline system 300 in accordance with this invention. This invention is premised on the observation that in a multiple-pipeline system, rarely if ever are all functions required in all of the pipelines. As contrast to the conventional heterogeneous systems, which are based on this same premise, however, this invention is also premised on the observation that it is not always practical or feasible to pre-define subsets of functions in each pipeline.

In a preferred embodiment of this invention, each example pipeline 320 includes a homogeneous arrangement of functional blocks, illustrated as example blocks F1-F6 in FIG. 1. For ease of reference, these functional blocks F1-F6 are referred to as "core" function blocks, because they are contained in each pipeline. Also illustrated in FIG. 3 is a pool 330 of auxiliary function blocks A-E 335. In accordance with this invention, the coupling between the core function blocks F1-F6 includes a switch 325 that selectively routes the data from the output of a core function block F1-F6 to a select auxiliary block A-E, and back to the next core function block in the sequence F1-F6. In this manner, each pipeline 320 can be configured to contain only the auxiliary function needed at the time that the pipeline 320 is configured. A control block 350 effects the control of the switches 325 to effect the desired configuration of functions within each pipeline.

The auxiliary blocks A-E 335 will typically include "special-purpose" functions that consume substantial resources but are not always required, whereas the core function blocks F1-F6 are functions that are typically required within any pipeline and/or functions that consume few resources. In a preferred embodiment for video processing, for example, the core function block F1 includes an interface to the fetch module 110 to receive and format the pixel information for subsequent processing, whereas an auxiliary function A 335 includes a color-lookup-table that is used to convert/expand pixel information that is encoded using color-indexing. All pipelines 320 likely require an interface to the fetch module 110, but a pipeline only needs access to the color-lookup-table if the data is color-indexed encoded and if the color information is needed for subsequent processing. In the illustrated system 300, two copies of auxiliary function A are provided, thereby allowing any two of the pipelines to be configured, in this example embodiment, to process color-indexed data. In like manner, the other auxiliary function blocks B-F in a preferred embodiment include a color-transient-improver, a sample-rate up-converter, a histogram-modifier, a luminance-sharpener, and a color-feature (flesh-tone, blue-stretch, etc.) module. The core functions F2-F6 in this preferred embodiment include chroma-keying for overlaying video and/or graphic layers, an un-ditherer, a chroma-upsampler, a linear interpolator, and a contrast balancer and color-space converter.

In a preferred embodiment, to ease the task of routing and switching, as well as facilitating efficient data processing, the auxiliary blocks A-F are allocated to specific location within the pipelines 320. That is, for example, auxiliary block A is configured to be placed between core function blocks F1 and F2; auxiliary blocks B and C are configured to be placed between core function blocks F2 and F3, and so on. Using this pre-configured arrangement, some of the switches 325 may be eliminated, if there are no auxiliary blocks that are allocated to be placed between particular core function blocks. One of ordinary skill in the art will recognize that the principles of this invention do not require a pre-configured arrangement, and could be applied to allow an unconstrained arrangement of auxiliary blocks 335 within each pipeline 320.

Figure 4:
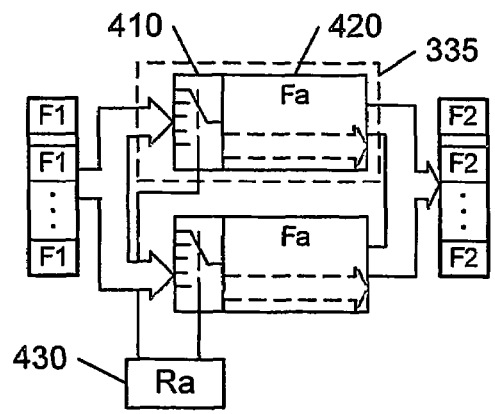
FIG. 4 illustrates an example block diagram of an auxiliary function block for a configurable multiple-pipeline system in accordance with this invention.

FIG. 4 illustrates an example block diagram of an auxiliary function block A 335 for a configurable multiple-pipeline system 300 in accordance with this invention. The block A 335 includes an input switch/selector/router 410, and a function module 420. As illustrated, the switch 410 selects which, if any, of the outputs from the core function block F1 in each pipeline to apply to the function module 420. The outputs from the function block F1 in each of the unselected pipelines is forwarded transparently to the input of the function block F2 in that pipeline, as is the output of function module 420 for the selected pipeline. In this preferred embodiment a control-register Ra 430, which is typically a component of the control module 350 of FIG. 3, controls the selective routing of the pipeline data through each of the copies of the auxiliary block A 335.

Figure 5:
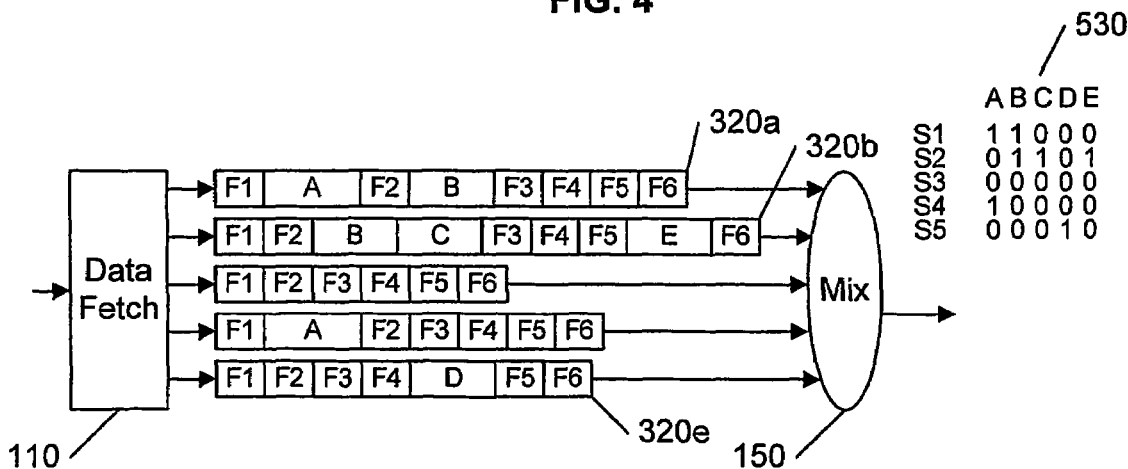
FIG. 5 illustrates an example dataflow diagram of a configured multiple-pipeline system in accordance with this invention.

FIG. 5 illustrates an example dataflow diagram of a configured multiple-pipeline system in accordance with this invention, using a control-register matrix 530. Each row S1, S2, . . . S5 of the matrix 530 corresponds to a pipeline 320a, 320b, . . . 320e, respectively. Each column A, B, . . . E corresponds to the corresponding auxiliary block A-E; a "1" in the column at a particular row indicates the use of the block in the corresponding pipeline. For example, the illustrated "11000" in the first row S1 effects the insertion of blocks A and B into the first pipeline 320a; the illustrated "01101" in the second row S2 effects an insertion of blocks B, C, and E into the second pipeline 320b; and so on. Note that because the auxiliary blocks A-E are preconfigured to be inserted between particular core blocks F1-F6, there is no need to indicate where the selected auxiliary block is to be inserted. Note also that the pool 330 of auxiliary blocks 335 in FIG. 3 illustrates that only two copies of block B are available, and thus no other row/pipeline can be configured to contain a block B, because the available two copies of block B have been allocated to pipelines 320a, 320b.

One of ordinary skill in the art will recognize that alternative schemes can be devised to control the select routing of pipeline data through select auxiliary function blocks in accordance with this invention. One will also recognize that this control can be effected at the commencement of each application, or can be effected dynamically within an application, or can be effected at the time of manufacture to create a special purpose device, as desired.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the illustrated preferred embodiment includes a plurality of homogeneous pipelines, one of ordinary skill in the art will recognize that this homogeneity is not a prerequisite to this invention. For example, one or more of the pipelines may be configured to contain all of the functional elements that are likely to be included in most video processing pipelines, while other pipelines may include core elements that are likely to be included in most graphic processing pipelines, or core elements that are likely to be included in commonly used reduced-capability pipelines, such as PIP pipelines. In like manner, some of the auxiliary elements may be configurable for insertion into only a subset of the pipelines. Also, although the auxiliary blocks A-E are presented as "function blocks"; one of ordinary skill in the art will recognize that one or more blocks A-E may include "passive blocks", such as a memory block that is allocated to particular pipelines as required. These and other system configuration and optimization features will be evident to one of ordinary skill in the art in view of this disclosure, and are included within the scope of the following claims.

What is claimed is:

1. A processing system comprising:
   a plurality of pipelines, each pipeline of the plurality of pipelines including a plurality of core pipeline elements that are configured to sequentially process data as it traverses the pipeline;
   a plurality of auxiliary elements, each auxiliary element of the plurality of auxiliary elements being configured to be selectively coupled, responsive to external coupling-select signals, to multiple pipelines of the plurality of pipelines and to be selectively coupled, within a selected pipeline of the multiple pipelines, between a pair of core pipeline elements of the plurality of core pipeline elements to process the data as it traverses between the pair of core elements.

2. The processing system of claim 1, wherein the data includes at least one of: video data and graphics data.

3. The processing system of claim 2, wherein the data that is provided to two or more of the pipelines corresponds to a common image.

4. The processing system of claim 2, wherein the data that is provided to two or more of the pipelines corresponds to different images.

5. The processing system of claim 2, wherein the plurality of core pipeline elements include at least one of: a pixel acquisition element, a pixel formatter, a chroma-keying element, an un-ditherer, a chroma-upsampler, a linear interpolator, a contrast balancer and a color-space converter.

6. The processing system of claim 5, wherein the plurality of auxiliary elements include at least one of: a color-lookup table, a color-transient-improver, a sample-rate up-converter, a histogram-modifier, a luminance-sharpener, and a color-feature module.

7. The processing system of claim 2, wherein the plurality of auxiliary elements include at least one of: a color-lookup table, a color-transient-improver, a sample-rate up-converter, a histogram-modifier, a luminance-sharpener, and a color-feature module.

8. The processing system of claim 1, wherein each auxiliary element is configured to be selectively coupled between a predetermined pair of core pipeline elements of the plurality of core pipeline elements.

9. The processing system of claim 1, wherein each auxiliary element includes: a function module, and a switch, wherein the switch is configured to select among the plurality of pipelines for the selective coupling of the auxiliary element to a select pipeline.

10. The processing system of claim 1, further including a register that is configured to control the selective coupling of the auxiliary elements into the plurality of pipelines responsive to the external coupling-select signals.

11. The processing system of claim 1, further including: a data fetch module, operably coupled to each of the pipelines, that is configured to facilitate acquisition of the data, and a mixer, operably coupled to each of the pipelines, that is configured to merge the data from two or more pipelines of the plurality of pipelines.

12. The processing system of claim 1, wherein the plurality of auxiliary elements includes a number of duplicate copies of a functional element, and the number of duplicate copies of the functional element is less than a number of pipelines in the plurality of pipelines.

13. The processing system of claim 1, further including a controller that facilitates the selective coupling of the auxiliary elements into the plurality of pipelines responsive to the external coupling-select signals.

14. The processing system of claim 13, wherein the controller is configured to effect the selective coupling upon commencement of an application that is executed via the processing system.

15. An integrated circuit comprising a plurality of homogeneous pipelines, and a controller that is configured to enable a modification, responsive to external coupling-select signals, of one or more pipelines of the plurality of homogeneous pipelines to produce a plurality of heterogeneous pipelines by using a routing matrix to add one or more auxiliary elements into a data path of at least one of the plurality of homogenous pipelines, the routing matrix configured and arranged to allow at least one auxiliary element to be added into two or more of the homogenous pipelines.

16. The integrated circuit of claim 15, further including one or more auxiliary elements that are configured to be selectively inserted within the one or more pipelines by the controller to produce the plurality of heterogeneous pipelines.

* * * * *